(12) United States Patent
Wood et al.

(10) Patent No.: US 6,729,578 B2
(45) Date of Patent: May 4, 2004

(54) SHORT RUNWAY AIRCRAFT LAUNCHING AND LANDING SYSTEM

(76) Inventors: John R. Wood, 1502 Yew, San Antonio, TX (US) 78232; Jeff S. Wood, 1143 Hedgestone, San Antonio, TX (US) 78258; Travis Wood, 1143 Hedgestone, San Antonio, TX (US) 78258

(*) Notice: Subject to any disclaimer, the term of this patent is extended or adjusted under 35 U.S.C. 154(b) by 0 days.

(21) Appl. No.: 10/308,807

(22) Filed: Dec. 3, 2002

(65) Prior Publication Data

US 2003/0102407 A1 Jun. 5, 2003

Related U.S. Application Data

(60) Provisional application No. 60/336,872, filed on Dec. 3, 2001.

(51) Int. Cl.[7] .................................................. B64F 1/04
(52) U.S. Cl. .......................... 244/63; 244/63; 104/290
(58) Field of Search .................... 244/63, 62; 104/290, 104/287, 292, 293; 310/90.5

(56) References Cited

U.S. PATENT DOCUMENTS

| | | | | |
|---|---|---|---|---|
| 3,220,216 A | * | 11/1965 | Byrne et al. | 244/63 |
| 3,604,665 A | * | 9/1971 | Jamison | 244/110 A |
| 3,820,472 A | * | 6/1974 | Schwarzler | 104/294 |
| 5,277,125 A | * | 1/1994 | DiFonso et al. | 104/292 |
| 5,653,174 A | * | 8/1997 | Halus | 104/124 |
| 6,170,402 B1 | * | 1/2001 | Rude et al. | 104/53 |

* cited by examiner

*Primary Examiner*—Charles T. Jordan
*Assistant Examiner*—T. Nguyen
(74) *Attorney, Agent, or Firm*—Jenkens & Gilchrist, PC

(57) ABSTRACT

A system and method for facilitating take-off from or landing on aircraft on a short runway includes a linear array of individual linear induction motors placed along the short runway. A reaction plate mounted to the aircraft is either accelerated or decelerated by the individual linear induction motors. A control system associated with each individual linear induction motor senses the presence of the aircraft, determines its speed, and applies a predetermined amount of electrical energy to either accelerate or decelerate the aircraft.

2 Claims, 2 Drawing Sheets

SHORT RUNWAY AIRCRAFT LAUNCHING AND LANDING SYSTEM

CROSS-REFERENCE TO RELATED APPLICATION

Figure 1:
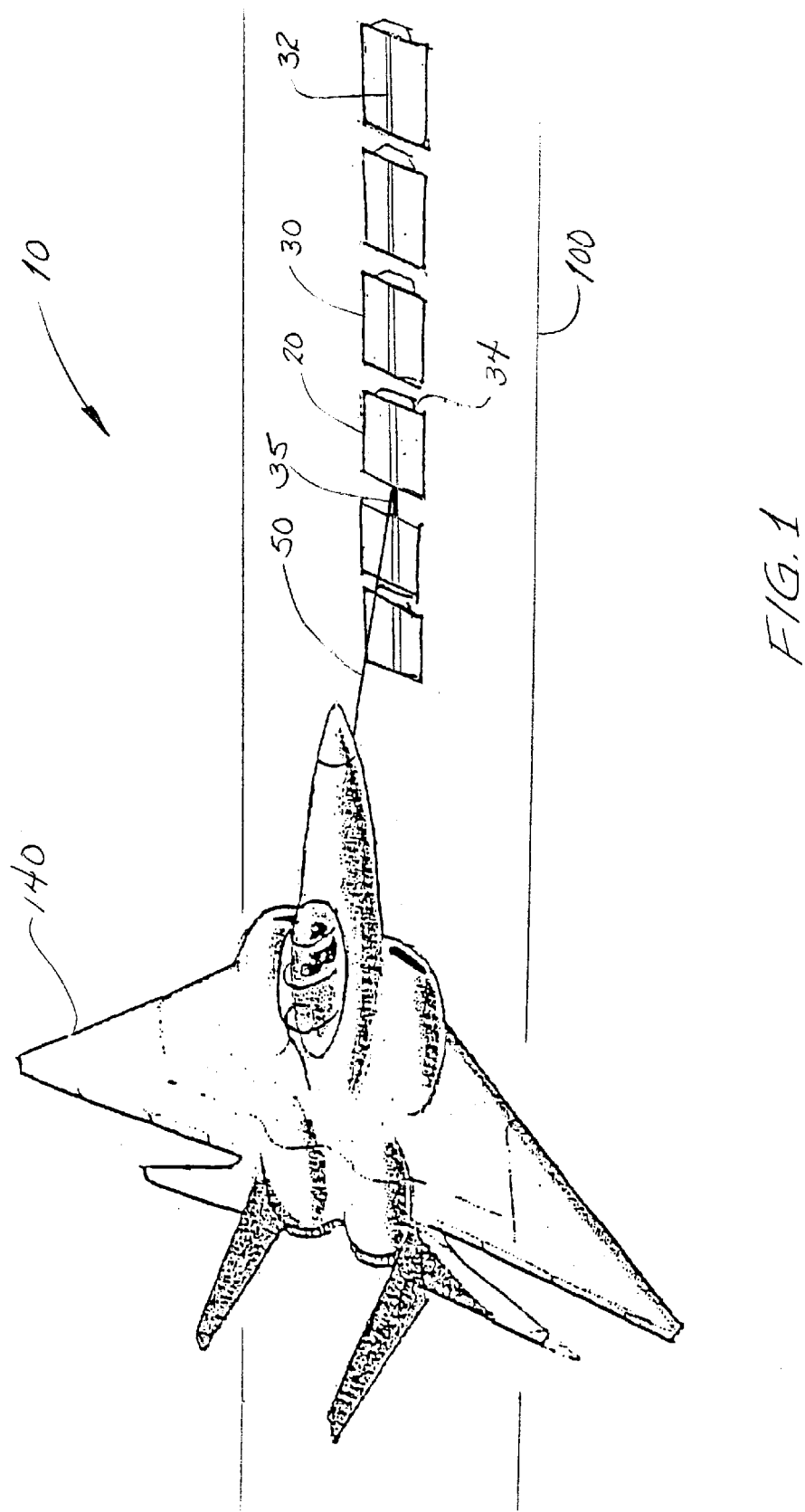

The present application claims the benefit of U.S. Provisional Application for Patent Ser. No. 60/336,872, filed Dec. 3, 2001.

FIELD

The present invention pertains to systems for assisting aircraft in becoming airborne or in landing on airfields with a short runway.

BACKGROUND

Heavy fixed wing aircraft, particularly military aircraft designed for use in combat operations, require a large force under the wings to lift the aircraft from the ground so that the aircraft may become airborne. This lifting force is generated by the velocity of the air over the wing. Typically, airplane runways designed for heavy fixed wing aircraft must be quite long. A long runway is needed to enable the aircraft to accelerate under its own power to a velocity which generates sufficient aerodynamic lift on the wings for the aircraft to become airborne. Accordingly, runways designed for use by heavy military and commercial aircraft may be several thousand feet long. In addition, these long runways must be oriented in a direction which takes advantage of prevailing winds; that is, the long runways direct the aircraft into the wind to further increase the flow of air over the wing. Because of geographic constraints, it is difficult, if not impossible, in many areas of the world to build runways of sufficient length that can by used by heavy military or commercial aircraft or that can be oriented into the prevailing winds. For example, mountainous terrain and congested metropolitan areas are not suitable locations for the construction of long runways.

Long runways are also needed for the deceleration of heavily loaded aircraft. In addition, long runways provide a margin of safety for stopping a landing aircraft when the primary means for slowing the forward motion of the aircraft becomes disabled.

For seaborne aircraft operations, the U.S. Navy typically uses a high pressure steam powered catapult to rapidly accelerate an aircraft, specially designed for use on aircraft carriers, to the air speed needed for the weight of the aircraft to be supported by airflow over its wings. When the mission is complete, the aircraft lands on an aircraft carrier by having a hook on the tail of the aircraft engage a heavy steel cable positioned across the deck. While the launching and landing of aircraft on seaborne aircraft carriers has been a routine part of U.S. Navy operations for more than fifty years, pilots continue to talk of the difficulty and danger associated with taking off from or landing on an aircraft carrier.

The use of a high pressure steam catapult to provide the necessary force to rapidly accelerate the aircraft for take-off from an aircraft carrier and a heavy steel cable to rapidly decelerate the aircraft for landing on the aircraft carrier also places all those working on the deck of the aircraft carrier in a hazardous environment. Any malfunction of the high pressure steam catapult or of the heavy steel landing cable unleashes tremendous forces. Such forces can cause severe physical injury or even death. Accordingly, despite the more than fifty years of use of seaborne carrier-based aircraft launching and landing systems, such systems have not found broad utilization on land-based airports, even land-based airports with short runways.

The need to acquire the ability to utilize airports with long runways for heavy fixed wing aircraft became apparent during the recent U.S. military operations conducted in Afghanistan. Rather than building new airports to launch heavy military aircraft, the U.S. was forced to make arrangements with neighboring nations for the take-off and landing of heavy fixed wing aircraft. Had nations close to Afghanistan not cooperated with the U.S., the ability to use heavy fixed wing aircraft may have been severely limited while the costs would have increased significantly. While available land sites for the location of airports may not be as short as the deck of an aircraft carrier, many available land sites are still not long enough to permit flight operations for heavy fixed wing aircraft.

There remains a need in the art for an easy to install and inexpensive system and method to enable heavy fixed wing aircraft to use land-based airports with short runways for flight operations.

SUMMARY

The short runway aircraft launching and landing system of the present invention provides an easy to install and inexpensive system and method which enables heavy fixed wing aircraft to take off and land from land-based airports with short runways.

The disclosed system and method uses Linear Induction Motors (LIM's) installed in short runways to provide the thrust necessary to launch heavy fixed wing aircraft into the air. Airports with short runways can also utilize LIM's or permanent magnets to decelerate the forward motion of the aircraft to facilitate a safe landing.

DESCRIPTION OF THE DRAWING FIGURES

Figure 2:
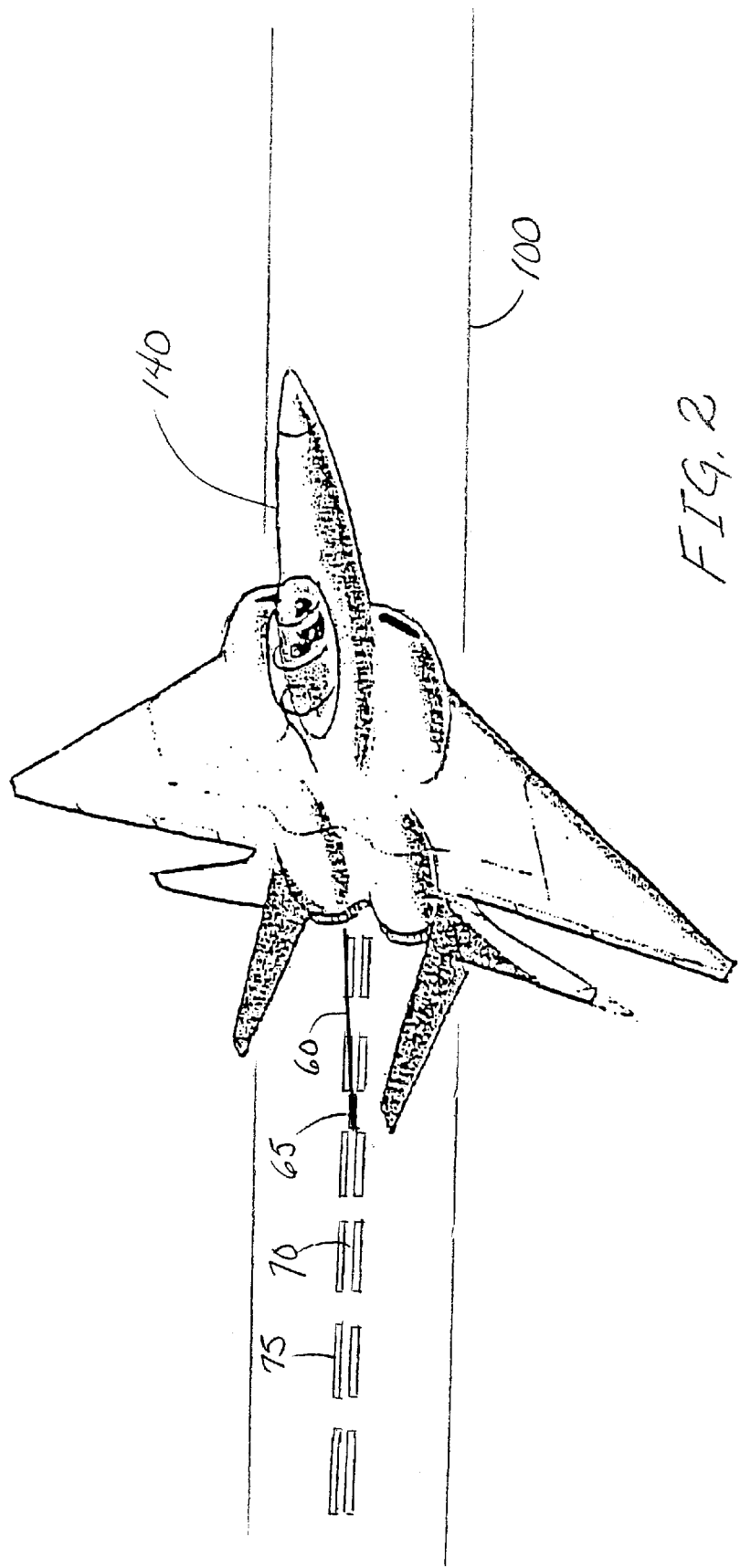

A better understanding of the present invention may be had by reference to the drawing figures wherein:

FIG. 1 is a perspective view of an aircraft being pulled down a short runway by a series of linear induction motors implanted in a short runway; and FIG. 2 is a perspective view of an aircraft being decelerated by a permanent magnet passing through pairs of plates implanted in a short runway.

DETAILED DESCRIPTION OF THE EMBODIMENTS

Currently, LIM's have found wide acceptance for use in "thrill" rides at amusement parks to accelerate people carriers such as roller coaster cars to relatively fast speeds in a very short period of time. For example, one Disney-MGM Studios theme park features a ride called the Rock-N-Roller Coaster that accelerates the cars holding the passengers from a dead stop to 60 mph in 2.8 seconds. Other rides at other theme parks are faster yet. In a system which accelerates people carriers, individual LIM thrust varies from 8 kN (1800 lb) per double sided pair of LIM's at low speed to 2 kN (450 lb) at high speed. These LIM's vary in length from 1.2 m to 2 m. Mechanically, an LIM system operates by causing an LIM reaction plate to pass over an LIM or to pass through a space between two LIM's.

The electrical energy used by LIM's on thrill rides spikes at 2500 kW. The greater the amount of current supplied to the LIM, the greater the acceleration of the people carrier. Energy cost is less than fifty cents per launch, making the LIM a highly efficient source of power.

Because of their versatility, LIM's can produce thrust forces which vary from just a few pounds to many thousands of pounds. Accordingly, an array of LIM's laid along a runway can produce enough thrust to launch an aircraft such as an F-16 weighing 37 tons in less than 400 feet. In the preferred embodiment, such a launching system would include multiple pairs of LIM's having a space therebetween and an aluminum LIM reaction plate being accelerated as it passes through the space between each pair of LIM's. A cable, flexible member, or drag link connecting the LIM reaction plate transmit the necessary force to accelerate the aircraft to take-off velocity.

The disclosed short field aircraft launching and landing system will allow for the creation of a small, strategically placed, easily defended, tactical airport with a short runway where none would have been possible before. Each of these small tactical airports would only need to house a few fighter aircraft in forward locations.

To defend key strategic locations within the continental United States, fighter aircraft could be stationed at small tactical airports which include the disclosed short field aircraft launching and landing system. These airports would be strategically located in close proximity to large population centers or adjacent to large open air stadiums. Such locations would allow for a quick response to potential or actual terrorist activities.

Outside the United States, the disclosed short field aircraft launching and landing system could be quickly installed by the Navy Seabees, the Army Corps of Engineers, or the Air Force's Civil Engineering units. Such installations would be in areas where terrorist activities are ongoing or where intelligence has shown such activities are being organized. Maximum dispersion of aircraft at small airports in forward areas would allow for quick defensive or preemptive offensive strikes by fighter aircraft.

A further understanding of the system and method of the present invention may be had by a brief description of a linear induction motor. A LIM is basically a rotating squirrel cage induction motor opened out to lay flat. Thus, instead of producing rotary torque, a LIM produces linear force on a LIM reaction plate. The force on the LIM reaction plate continues to increase the speed of the reaction plate with respect to the LIM as it passes near the LIM. As previously indicated, the force to accelerate the LIM reaction plate can be increased by passing the LIM through a slot or space between two LIM's.

The advantages of LIM's include: no moving parts, silent operation, reduced maintenance, compact size, and ease of control and installation. LIM's are also used in situations requiring a fast response, high acceleration force, and high braking forces. Speed is not dependent on contact friction; that is, no gears or chains which require lubrication and maintenance are used in the disclosed system and method. Fewer moving parts mean simpler systems with reduced long term operating costs.

Standard mechanical protection of the LIM's may be provided by epoxy resin encapsulation while additional protection may be provided by stainless steel covers, hermetic sealing of motors in stainless enclosures, or even embedding motors in iron castings. Cooling can be provided by methods such as free air convection, forced air, or open/closed loop water cooling.

LIM's can be designed in many different sizes with varying power outputs. The speed imparted to the LIM reaction plate may vary from zero to many meters/second and is determined by design of the LIM and the characteristics of the electrical energy supplied to the LIM. The speed to which the LIM reaction plate is accelerated can be controlled by either simple or complex electronic control systems. Stopping, starting, and reversing the travel of the reaction plate are easily accomplished by modifying the flow of electrical energy to the LIM.

The system and method 10 of the present invention produces motion in a unique manner. As shown in FIG. 1, pairs 20 of LIM's are arranged in linear fashion along the length of a runway 100. An aluminum LIM reaction plate 35 is positioned to travel through the space 32 between the LIM's 30. Connected to the aluminum LIM reaction plate would be a connection to the aircraft such as a cable or a drag link 50. Electronic control equipment 34 at each individual LIM 30 senses the presence of the aircraft 140 and measures its speed. The electronic control equipment then energizes each LIM 30 as the aircraft 140 approaches. The thrust provided at each pair of LIM's 20 is varied to achieve a predetermined exit speed from the LIM. The spacing between each LIM 30 varies according to the acceleration required, and includes an allowance for redundancy or failure.

Deceleration of aircraft is done in effectively the same manner. As will be understood by those of ordinary skill in the art, once a landing aircraft touches down on the runway, it picks up a cable or a connection to an aluminum LIM reaction plate which is positioned to travel through the space between the pair of LIM's. The proximity of the aircraft is sensed and the speed is measured by the electronic control equipment. The electronic control equipment at each individual LIM 30 energizes the LIM to provide the needed negative thrust to quickly decelerate the aircraft.

Alternatively and as shown in FIG. 2, the deceleration of the aircraft 140 may be accomplished by causing the aircraft 140 to pick up a cable 60 or a connection to a high strength permanent magnet 65 such as a rare earth permanent magnet. The rare earth permanent magnet 65, if caused to pass through a slot 70 formed between two pieces of aluminum or two pieces of copper 75, will be rapidly decelerated, thus causing the aircraft 140 to come to a stop.

Those of ordinary skill in the art will understand that numerous other embodiments of the foregoing invention are enabled by this disclosure. Such other embodiments shall fall within the scope and meaning of the appended claims.

What is claimed is:

1. A system for increasing the linear speed of an aircraft on a runway comprising:

a linear array of pairs of linear induction motors positioned to have a space therebetween, said pairs of linear induction motors being placed at predetermined intervals along the runway;

a linear induction motor reaction plate constructed and arranged to pass through said space;

means for connecting the aircraft to said linear induction reaction plate;

a control system associated with each pair of individual linear induction motors in the linear array of linear induction motors for sensing the proximity of the aircraft and the speed of the aircraft;

said control system associated with each individual linear induction motor being constructed and arranged to provide the individual linear induction motor with which it is associated with the proper amount of electrical energy to impart a force on the reaction plate to accelerate the aircraft from said sensed speed to a greater speed.

2. A method for increasing the linear speed of an aircraft on a runway comprising the steps of:

placing a linear array of pairs of linear induction motors with a space therebetween at predetermined intervals along the runway;

placing a linear induction motor reaction plate within said space;

connecting the aircraft to the linear induction motor reaction plate to enable each individual linear induction motor in the linear array of linear induction motors to impart a force on the linear induction motor reaction plate;

associating a control system with each pair of individual linear induction motors in the linear array of pairs of linear induction motors for sensing the proximity of the aircraft and the speed of the aircraft;

said control system associated with each individual linear induction motor being constructed and arranged to provide the pair of individual linear induction motors with which it is associated with the proper amount of electrical energy to impart a force on the linear induction motor reaction plate to accelerate the aircraft from said sensed speed to a greater speed.

* * * * *